Figure 1:
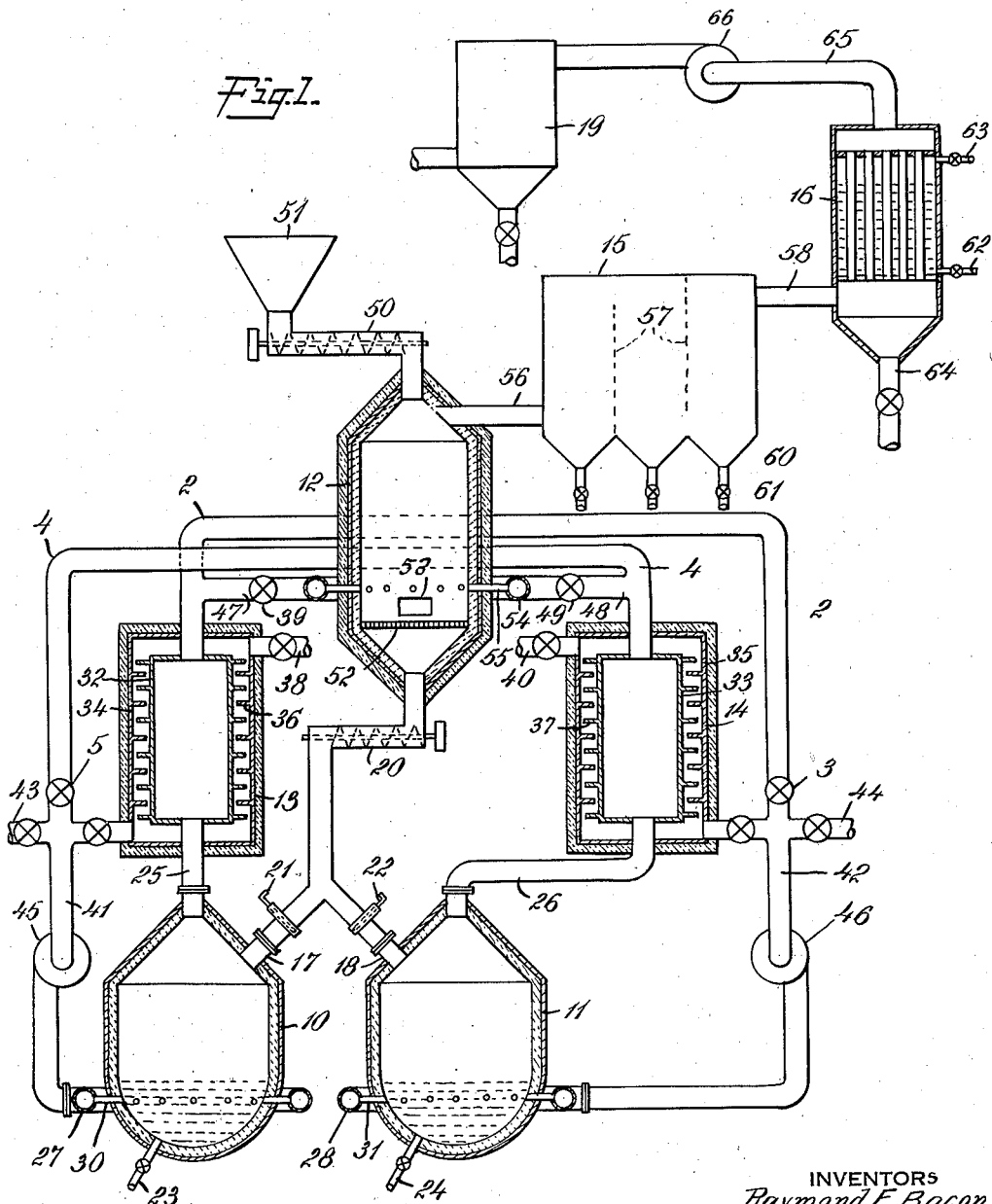

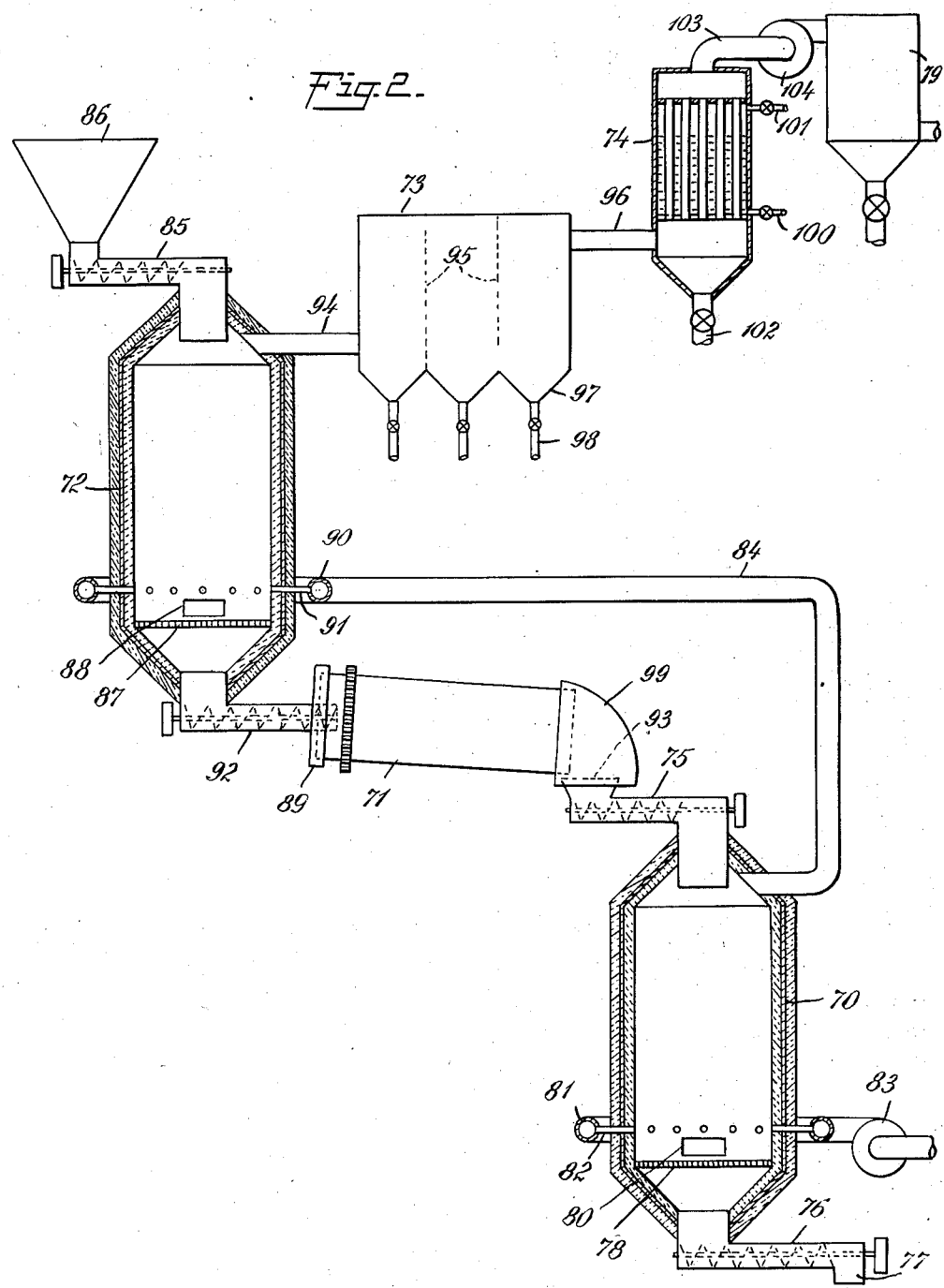

Patented July 27, 1937

2,087,891

UNITED STATES PATENT OFFICE 2,087,891

RECOVERY OF SULPHUR

Raymond F. Bacon, Bronxville, N. Y., and Wilber Judson, Newgulf, Tex.

Application October 18, 1934, Serial No. 748,949

3 Claims. (Cl. 23—226)

This invention relates to the recovery of sulphur and has for an object the provision of an improved process and apparatus for recovering elemental sulphur from metal sulphide-bearing material. More particularly, the invention contemplates the provision of an improved process and apparatus for recovering elemental sulphur from pyrites.

The present invention contemplates the effective utilization of heat capable of being developed by reactions involved in or associated with the oxidation of pyrites for the recovery of the sulphur of the pyrites in elemental form. The method of the invention involves the oxidation of an iron sulphide product resulting from the distillation of pyrites under such conditions as to produce sufficient heat to facilitate the reduction of sulphur dioxide produced in the oxidizing operation and to effect the distillation of the pyrites. According to a preferred method of the invention, the iron sulphide residue from a pyrites distillation operation is subjected while molten to an oxidizing operation to produce iron oxide and a substantially oxygen-free gaseous product containing sulphur dioxide. According to another preferred method of the invention, the iron sulphide residue from a pyrites distillation operation is subjected to a suspension roasting operation to produce iron oxide and a gaseous product containing sulphur dioxide. The oxidizing operations are so controlled that the temperature of the gaseous products is sufficiently high to effect a reaction between the sulphur dioxide contained therein and a reducing agent. The gaseous products of the oxidizing operations are passed in contact with mixtures of finely divided pyrites and finely divided solid carbonaceous material in suspension to effect the reduction of sulphur dioxide contained in the gases, distillation of the volatile sulphur of the pyrites and the production of iron sulphide products which are subsequently treated in the oxidizing operations.

The invention will be better understood from a consideration of the following description in conjunction with the accompanying drawings showing schematically apparatus which may be employed in carrying out a process of the invention, and in which Fig. 1 illustrates apparatus for use in carrying out a process of the invention when the residue from the distillation operation is subjected to the action of an oxidizing gas while molten; and Fig. 2 illustrates apparatus for use in carrying out a process of the invention when the residue from the distillation operation is subjected to the action of an oxidizing gas while in suspension in the oxidizing gas.

The apparatus shown in Fig. 1 of the drawing comprises oxidizing chambers 10 and 11 in the form of molten bath receptacles, a combined reducing and distillation chamber 12, heat exchangers 13 and 14, a dust collector 15, a condenser 16 and an electrical precipitator 19, all so connected by suitable means that iron sulphide-bearing material may be delivered from the combined reducing and distillation chamber to the oxidizing chambers and gases from the oxidizing chambers may be subjected progressively to heat exchanging, reducing, dust removing, cooling or condensing and precipitating treatments.

The oxidizing chambers 10 and 11 are similar in structure to ordinary copper converters, each comprising a steel outer shell lined with refractory material such as magnesite brick. The upper portions of the oxidizing chambers communicate through conduits 17 and 18 with a screw conveyor 20 which is adapted to deliver materials to be treated from the lower portion of the distillation and reducing chamber to the oxidizing chambers. The conduits 17 and 18 are provided with valves or dampers 21 and 22 which may be manipulated to close off one or both of the oxidizing chambers from communication with the screw conveyor 20. The screw conveyor 20 is so constructed and arranged that materials may be delivered from the reducing and distillation chamber to the oxidizing chambers without admitting air to any chamber. The lower portions of the oxidizing chambers are provided with tapping spouts 23 and 24 through which the molten oxidized product may be withdrawn upon completion of the oxidizing treatment.

The upper portions of the oxidizing chambers are tightly connected to conduits or flues 25 and 26 which are, in turn, tightly connected to the heat exchangers 13 and 14. Annular manifolds 27 and 28 surrounding the oxidizing chambers and communicating therewith through tuyères 30 and 31 are provided for introducing air into the oxidizing chambers.

The oxidizing chambers may be stationary or mounted for tilting movement on any suitable type of supporting structure.

The heat exchangers 13 and 14 comprise inner chambers 32 and 33 formed of good heat conducting material and heat insulated jackets 34 and 35 surrounding the inner chambers and having their walls spaced from the walls of the inner chambers to provide passages therebetween. The passages between the inner chambers 32 and 33 and the jackets 34 and 35 of the heat exchangers are provided with staggered baffles 36 and 37 for providing tortuous paths of travel for gases. Air may be admitted to the passages between the inner chambers and the jackets through inlets 38 and 40, and heated air may be withdrawn through conduits 41 and 42 which communicate with the manifolds 27 and 28 associated with the roasting chamber. Air inlets 43 and 44 open to the atmosphere or connected to suitable sources of air under pressure (not shown) communicate with the conduits 41 and 42. Blowers 45 and 46 are included in the conduits 41 and 42 to cause air to flow through the heat exchangers and to aid in introducing air into the oxidizing chambers.

Conduits 47 and 48 provide passages for conducting hot gases from the inner chambers 32 and 33 of the heat exchangers to the reducing and distillation chamber 12. The conduit 47 leading from the oxidizing chamber 10 and heat exchanger 13 is connected to the conduit 42 (through which oxidizing gases are introduced into the oxidizing chamber 11) ahead of the blower 46 by means of a conduit 2 having a valve 3 included therein. Similarly, the conduit 48 leading from the oxidizing chamber 11 and heat exchanger 14 is connected to the conduit 41 (through which oxidizing gases are introduced into the oxidizing chamber 10) ahead of the blower 45 by means of a conduit 4 having a valve 5 included therein. The valves 3, 5, 39 and 49 may be manipulated to pass the gaseous product from chamber 10 through a molten bath in chamber 11 or the gaseous product from chamber 11 through a molten bath in chamber 10.

The reducing and distillation chamber is an upright cylindrical chamber lined with heat refractory material and covered with heat insulating material. The upper portion of the reducing and distillation chamber communicates with a screw conveyor 50 which is adapted to deliver materials for treatment from a storage hopper 51 to the reducing and distillation chamber. The screw conveyor 50 is so constructed and arranged that materials may be delivered to the reducing and distillation chamber without admitting air. The reducing and distillation chamber is provided with a grate 52 for collecting agglomerations too large for convenient passage through the conveyor 20. A work hole 53 provided with a suitable removable cover permits access to the interior of the chamber for the purpose of breaking or removing agglomerations collected on the grate 52. An annular manifold 54 surrounding the reducing and distillation chamber and communicating therewith through tuyères 55 is provided for introducing hot gases from the conduits 47 and 48 leading from the heat exchangers into the interior of the reducing and distillation chamber.

A conduit 56 provides a passage for conducting gases from the upper portion of the reducing and distillation chamber to the interior of the dust collector 15. The dust collector is provided with a series of baffles 57 so arranged as to provide a tortuous path for the flow of gases between the inlet conduit 56 and an outlet 58. The bottom of the dust collector is provided with a number of hoppers 60 for the reception of dust particles removed from the gas stream. The hoppers 60 are provided with valved outlets 61 through which dust particles collected in the hoppers may be withdrawn. The dust collector outlet 58 communicates with the lower portion of the condenser 16.

The condenser 16 is in the form of a fire tube boiler provided with a valved inlet 62 for water and a valved outlet 63 for steam. Condensate formed in the condenser may be withdrawn from the lower portion thereof through a valved outlet 64. Gases may be conducted from the condenser through an outlet conduit 65 having a fan 66 included therein to the electrical precipitator 19 which may be of any suitable construction.

The apparatus shown in Fig. 2 of the drawings comprises a suspension roasting chamber 70, a grinding mill 71, a combined reducing and distillation chamber 72, a dust collector 73, a condenser 74 and an electrical precipitator 79, all so connected by suitable means that iron sulphide-bearing material may be delivered from the combined reducing and distillation chamber to the roasting chamber in suitable form for suspension roasting and gases from the roasting chamber may be subjected progressively to reducing, dust removing, cooling or condensing and precipitating treatments.

The roasting chamber 70 is an upright cylindrical chamber covered with heat insulating material and provided with a heat refractory lining. The upper portion of the roasting chamber communicates with a screw conveyor 75 which is adapted to deliver iron sulphide-bearing material to be roasted from the combined reducing and distillation chamber 72. The lower portion of the roasting chamber communicates with a screw conveyor 76 which is adapted to convey solid materials from the roasting chamber to a discharge outlet 77. The screw conveyors 75 and 76 are so constructed and arranged that materials may be delivered to and removed from the roasting chamber without admitting air to the chamber. A grate 78 is disposed within the lower portion of the roasting chamber to collect agglomerations too large for convenient passage through the conveyor 76. A work hole 80 provided with a suitable removable cover permits access to the interior of the roasting chamber for the purpose of removing or breaking agglomerations collected on the grate 78. An annular manifold 81 surrounding the roasting chamber and communicating therewith through tuyères 82 is provided for introducing air into the roasting chamber from a fan or blower 83.

A conduit 84 provides a passage for conducting hot gases from the roasting chamber to the reducing and distillation chamber. Control of the temperature of gases entering the reducing and distillation chamber may be accomplished by varying the insulation on the conduit 84. The reducing and distillation chamber 72 is an upright cylindrical chamber similar in structure to the roasting chamber. The upper portion of the reducing and distillation chamber communicates with a screw conveyor 85 which is adapted to deliver materials for treatment from a storage hopper 86 to the reducing and distillation chamber. The screw conveyor 85 is so constructed and arranged that materials may be delivered to the reducing and distillation chamber without admitting air. The reducing and distillation chamber is provided with a grate 87 and work hole 88 similar to those provided in the roasting chamber. An annular manifold 90 surrounding the reducing and distillation chamber and communicating therewith through tuyères 91 is provided for introducing hot gases from the conduit 84 leading from the roasting chamber into the interior of the reducing and distillation chamber. The lower portion of the reducing and distillation chamber communicates with a screw conveyor 92 which delivers material to be roasted from the reducing and distillation chamber to the grinding mill 71 for grinding to particle sizes suitable for suspension roasting. The feed and discharge ends of the grinding mill are provided with hoods 89 and 90 which prevent contact of the atmosphere with materials delivered to and discharged from the grinding mill. The grinding mill discharges a dry, finely divided product into a hopper 93 which communicates with the screw conveyor 75 provided for delivering materials to be roasted to the roasting chamber.

A conduit 94 provides a passage for conducting gases from the upper portion of the reducing and distillation chamber to the interior of the dust collector 73. The dust collector is provided with a series of baffles 95 so arranged as to provide a tortuous path for the flow of gases between the inlet conduit 94 and an outlet 96. The bottom of the dust collector is provided with a number of hoppers 97 for the reception of dust particles removed from the gas stream. The hoppers 97 are provided with valved outlets 98 through which dust particles collected in the hoppers may be withdrawn. The dust collector outlet 96 communicates with the lower portion of the condenser 74.

The condenser 74 is in the form of a fire tube boiler provided with a valved inlet 100 for water and a valved outlet 101 for steam. Condensate formed in the condenser may be withdrawn from the lower portion thereof through a valved outlet 102. Gases may be conducted from the condenser through an outlet conduit 103 having a fan 104 included therein to the electrical precipitator 79 which may be of any suitable construction.

In employing apparatus of the type illustrated in Fig. 1 of the drawings for carrying out a method of the invention, a mixture of pyrites and solid carbonaceous material, such, for example, as coke in finely divided form, preferably minus 40-mesh, is introduced into the upper portion of the reducing and distillation chamber 12 from the storage hopper 51 by means of the screw conveyor 50. The pyrites particles and carbon particles, in passing downwardly through the reducing and distillation chamber encounter an upwardly rising current of hot substantially oxygen-free gases from the oxidizing chambers and heat exchangers introduced into the reducing and distillation chamber through the tuyères 55. The particles of carbonaceous material and pyrites are heated by the gases to a temperature at which distillation of the volatile sulphur of the pyrites and reduction of the sulphur dioxide of the gases by means of the carbonaceous material are effected. The gaseous product containing the sulphur of the sulphur dioxide and the volatile sulphur of the pyrites in the form of elemental sulphur vapor and a solid product comprising the residue of the pyrites, substantially in the form of the monosulphide of iron, are thus produced. The gaseous product passes to the dust collector 15 through the outlet conduit 56. The solid residue from the pyrites is delivered to the screw conveyor 20 which conveys it to the oxidizing chambers 10 and 11.

The iron sulphide-bearing material passes from the conveyor 20 through the conduits 17 and 18 into molten baths in the bottoms of the oxidizing chambers.

Operation of the oxidizing chambers may be initiated by melting a small charge of iron sulphide-bearing materials in the chambers by combustion of any suitable fuel or by retaining portions of molten baths produced in preceding operations.

Air is introduced into the molten baths within the oxidizing chambers through the tuyères 30 and 31. The oxygen of the air reacts with the iron sulphide to produce gaseous sulphur dioxide and molten iron oxide. The introduction of iron sulphide-bearing material into the oxidizing chambers may be continued for periods varying from one to several hours until the operating capacity of each chamber has been reached. When charging has been completed, blowing is continued until substantially all sulphur has been removed. The resulting molten baths, consisting largely of iron oxide are then removed through the tapping spouts. Preferably, the operations of the two oxidizing chambers are staggered in order to permit charging and tapping at different times and thus permit continuous operation of the process and the production of a substantially uniform sulphur dioxide product.

The oxidizing operations are preferably so controlled that substantially oxygen-free gaseous products containing sulphur dioxide are introduced into the reducing and distillation chamber. Preferably, the gaseous products introduced into the reducing and distillation chamber contain not more than about one percent of free oxygen.

When the sulphur content of a charge in an oxidizing chamber is nearly exhausted, the oxygen content of the gaseous product tends to increase. Introduction of the resulting gaseous product of relatively high oxygen content into the reducing and distillation chamber may be avoided by passing the gaseous product through a molten bath of higher sulphur content in another oxidizing chamber.

When the charges in the oxidizing chambers contain sufficient sulphur to insure the production of substantially oxygen-free gaseous products, the operations are conducted with valves 39 and 49 open, valves 3 and 5 closed and the valves associated with the air inlets 43 and 44 and the air passages of the heat exchangers suitably adjusted to provide satisfactory volumes of oxidizing gas at proper temperatures. When the sulphur content of one of the charges becomes reduced to the point at which the oxygen content of the gaseous product increases to an undesirable amount, the gaseous product is passed in series with the other oxidizing chamber. In the staggered operation of the oxidizing chambers, the oxidizing operations are commenced at different times, and a charge containing sufficient sulphur to insure the production of a substantially oxygen-free gaseous product will always be undergoing treatment. Staggering of the operations is carried out to maintain in one chamber a charge containing sufficient sulphur to insure the production of a substantially oxygen-free gaseous product until the sulphur of the charge in the other chamber has been substantially completely eliminated and the treatment of a fresh charge has been commenced after removal of the substantially sulphur-free charge.

The gaseous product formed in chamber 10 may be passed through a molten charge in chamber 11 by opening the valve 3, closing the valve 39 and suitably adjusting the valves associated with the air inlet 44 and the air passage in the heat exchanger 14 to cause a flow of gases from the conduit 2 through the conduit 42 and blower 46. Similarly, the gaseous product formed in chamber 11 may be passed through a molten bath in chamber 10 by opening the valve 5, closing the valve 49 and suitably adjusting the valves associated with the air inlet 43 and the air passage in the heat exchanger 13 to cause a flow of gases from the conduit 4 through the conduit 41 and blower 45.

The sulphur dioxide, together with the inert gases introduced into the oxidizing chambers with the air, passes through the conduits 25 and 26 to the heat exchangers 13 and 14. The gases entering the heat exchangers, after having been cooled to the desired temperature, preferably in the neighborhood of 1000° C., flow through the conduits 47 and 48 to the manifold 54 from where they enter the reducing and distillation chamber through the tuyères 55.

The sulphur laden gases from the upper portion of the reducing and distillation chamber are introduced into the dust collector 15 through the conduit 56 and flow through the dust collector to the outlet 58. During the course of the passage of the sulphur laden gases through the dust collector, substantially all dust particles are removed. The cleaned gases passing out of the dust collector through the conduit 58 enter the condenser 16 in which a temperature sufficiently low to effect condensation of the sulphur vapor contained in the gases is maintained. A temperature of about 115° C. to 150° C. is preferably maintained in the condenser. Substantially sulphur-free gases may be conducted from the condenser through the outlet 65 to the electrical precipitator 19 in which entrained sulphur particles may be removed. Molten sulphur collected in the lower portion of the condenser is withdrawn through the outlet 64.

In employing apparatus of the type illustrated in Fig. 2 of the drawing for carrying out a method of the invention, a mixture of pyrites and solid carbonaceous material such, for example, as coke in finely divided form, preferably minus 40-mesh, is introduced into the upper portion of the reducing and distillation chamber 72 from the storage hopper 86 by means of the screw conveyor 85. The pyrites particles and carbon particles, in passing downwardly through the reducing and distillation chamber encounter an upwardly rising current of hot gases from the roaster introduced into the chamber through the tuyères 91. The particles of carbonaceous material and pyrites are heated by the gases to a temperature at which distillation of the volatile sulphur of the pyrites and reduction of the sulphur dioxide of the gases by means of the carbonaceous material are effected. A gaseous product containing the sulphur of the sulphur dioxide and the volatile sulphur of the pyrites in the form of elemental sulphur vapor and a solid product comprising a residue of the pyrites, substantially in the form of the mono-sulphide of iron, are thus produced. The gaseous product passes to the dust collector 73 through the outlet conduit 94. The solid residue from the pyrites is delivered to the screw conveyor 92 which conveys it to the grinding mill 71 in which a dry finely divided product having a particle size suitable for suspension roasting (preferably minus 40-mesh) is produced. The mill product is delivered to the hopper 93 and conveyed from there by the screw conveyor 75 to the roasting chamber.

The iron sulphide particles are showered into the roasting chamber by the screw conveyor 75 and, in passing downwardly through the roasting chamber, they encounter an upwardly rising current of air introduced into the chamber through the tuyères 82. The oxygen of the air reacts with the iron sulphide to produce gaseous sulphur dioxide and solid iron oxide. The solid iron oxide collects in the lower portion of the roasting chamber and is removed therefrom by means of the screw conveyor 76. The sulphur dioxide, together with the inert gases introduced into the roasting chamber with the air, passes through the conduit 84 to the reducing and distillation chamber. The gases from the roaster, after having been cooled to the desired temperature during the course of their flow through the conduit 84, preferably in the neighborhood of 1000° C., enter the manifold 90 from where they enter the reducing and distillation chamber through the tuyères 91. Operation of the roasting chamber is so controlled that a substantially oxygen-free gaseous product containing sulphur dioxide is formed. Preferably, the gaseous product of the roasting operation contains not more than about one percent of free oxygen.

The sulphur laden gases from the upper portion of the reducing and distillation chamber are introduced into the dust collector 73 through the conduit 94 and flow through the dust collector to the outlet 96. During the course of the passage of the sulphur laden gases through the dust collector, substantially all dust particles are removed. The cleaned gases passing out of the dust collector through the conduit 96 enter the condenser 74 in which a temperature sufficiently low to effect condensation of the sulphur vapor contained in the gases is maintained. A temperature of about 115° C. to 150° C. is preferably maintained in the condenser. Substantially sulphur free gases are conducted from the condenser through the outlet 103 to the electrical precipitator 79 in which the entrained sulphur particles may be removed. Molten sulphur collected in the lower portion of the condenser is withdrawn through the outlet 103.

It will be understood that the apparatus illustrated in the drawings is merely illustrative and is not intended to be restrictive of the invention in any respect.

We claim:

1. The method of producing elemental sulphur which comprises suspending a mixture of finely-divided pyrites and carbonaceous matter in a stream of gas containing sulphur dioxide at a temperature of about 1000° C. whereby reduction of the sulphur dioxide and distillation of the volatile sulphur of the pyrites is effected and a solid residue of agglomerated particles corresponding substantially to the monosulfide of iron is produced, subjecting the agglomerated particles to a grinding operation, thereby to break up the agglomerates and to form a product of sufficient fineness for oxidation in gaseous suspension, subjecting the ground product to a suspension oxidation operation to produce a gaseous product containing sulphur dioxide, and utilizing the gaseous product of the oxidizing operation for suspending the pyrites and carbonaceous material in the reducing and distillation operation.

2. The method of producing elemental sulphur which comprises suspending a mixture of finely divided pyrites and carbonaceous material in a stream of gas containing sulphur dioxide at a temperature sufficiently high to effect reduction of the sulphur dioxide and distillation of the volatile sulphur of the pyrites, grinding the residue of the pyrites, subjecting the ground residue of the pyrites from the distillation operation to a suspension oxidizing operation to produce a gaseous product containing sulphur dioxide, and utilizing the gaseous product of the oxidizing operation for suspending the pyrites and carbonaceous material in the reducing and distillation operation.

3. Apparatus for use in the production of elemental sulphur comprising a suspension roasting chamber, a suspension reducing and distillation chamber, means for introducing an oxidizing gas into the roasting chamber to effect oxidation of iron sulphide in suspension therein with the production of a gaseous product containing sulphur dioxide, means for introducing a mixture of finely divided carbonaceous material and finely divided pyrites into the reducing and distillation chamber, means for introducing the gaseous product formed in the roasting chamber into the reducing and distillation chamber to form a suspension of carbonaceous material and pyrites introduced thereinto and to effect reduction of the sulphur dioxide of the gaseous product and the distillation of the volatile sulphur of pyrites introduced into the reducing and distillation chamber with the production of elemental sulphur vapor and a solid product corresponding substantially to the monosulphide of iron, means for grinding the solid product formed in the reducing and distillation chamber, means for introducing the ground product into the roasting chamber, means for withdrawing gases from the reducing and distillation chamber, and means for recovering elemental sulphur from gases withdrawn from the reducing and distillation chamber.

RAYMOND F. BACON.
WILBER JUDSON.